(No Model.) 2 Sheets—Sheet 1.

D. F. LONG.
COMBINED CHILD'S WAGON, VELOCIPEDE, AND BABY WALKER.

No. 474,138. Patented May 3, 1892.

Witnesses
Inventor
David F. Long
Attorney (No Model.) 2 Sheets—Sheet 2.

D. F. LONG.
COMBINED CHILD'S WAGON, VELOCIPEDE, AND BABY WALKER.

No. 474,138. Patented May 3, 1892.

Witnesses
Inventor
David F. Long

UNITED STATES PATENT OFFICE.

DAVID F. LONG, OF WADSWORTH, OHIO.

COMBINED CHILD'S WAGON, VELOCIPEDE, AND BABY-WALKER.

SPECIFICATION forming part of Letters Patent No. 474,138, dated May 3, 1892.

Application filed May 28, 1891. Serial No. 394,424. (No model.)

*To all whom it may concern:*

Be it known that I, DAVID F. LONG, a citizen of the United States, residing at Wadsworth, in the county of Medina and State of Ohio, have invented a certain new and useful Improvement in a Combined Child's Wagon, Velocipede, and Baby-Walker, of which the following is a specification.

The object of my invention is to produce a vehicle which by slight changes in connected, attachable, and detachable parts may be used as a child's wagon, a velocipede, and a baby-walker and readily converted from one to the other.

My invention consists in the peculiar and novel apparatus and in the construction, arrangement, and combination of parts hereinafter described and then specifically claimed, reference being had to the drawings forming a part of this specification.

Figure 1:
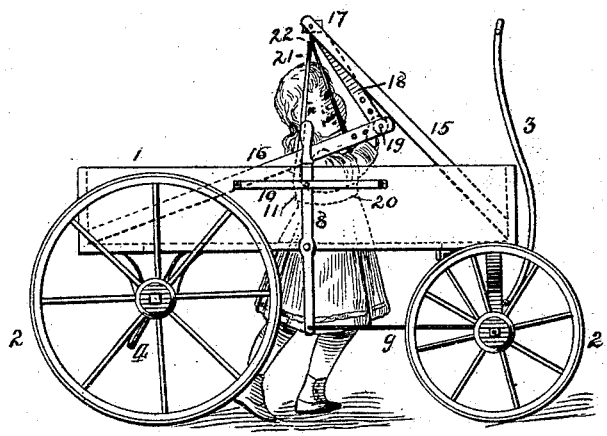
Figure 2:
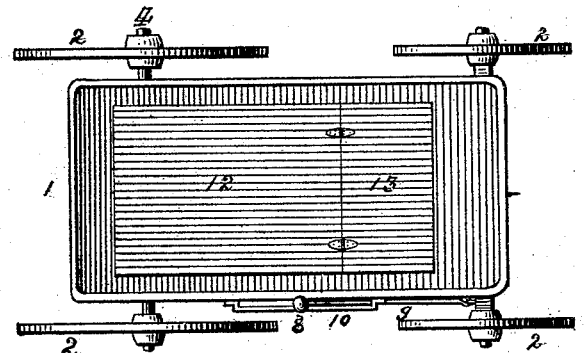
Figure 3:
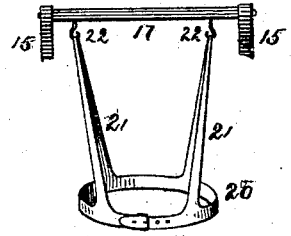
Figure 4:
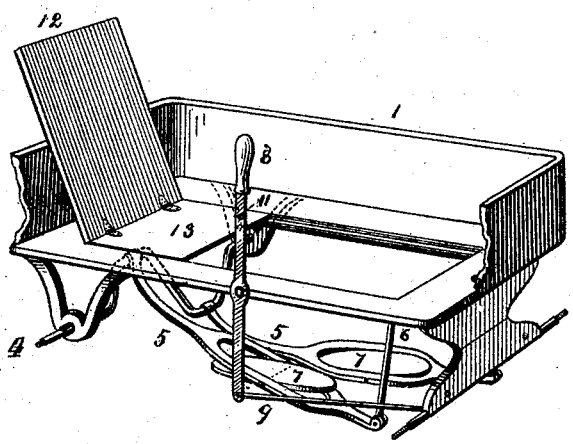
Figure 5:
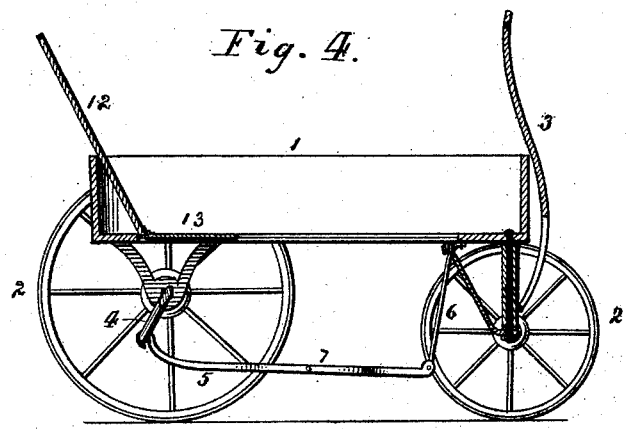

In the accompanying drawings, in which similar reference-numerals indicate like parts in the different figures, Figure 1 is a side elevation of the vehicle adapted to be used as a baby-walker; Fig. 2, a plan of the vehicle adapted to be used as a child's wagon. Fig. 3 shows the child's harness and part of the supporting-frame illustrated in Fig. 1; Fig. 4, a perspective view of the vehicle-box and part of the gearing when converted into a velocipede, the nearer parts of the box broken away to show the operative parts; Fig. 5, a vertical central longitudinal section of the vehicle as shown in Fig. 4; and Fig. 6 a rear elevation of the vehicle, as shown in Fig. 2, with the box in section immediately in advance of the end-board.

Figure 6:
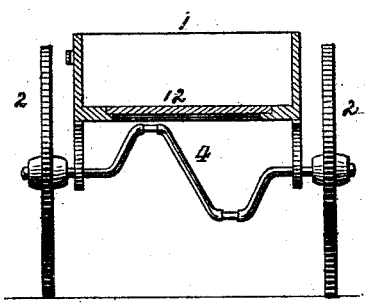

The vehicle consists of a four-wheeled wagon constructed in the usual or any desired or approved manner, having a box or bed and wheels 2, the forward axle arranged by a king-bolt and fifth-wheel to be turned and provided with a tongue 3, by which the vehicle may be drawn and which is arranged to be swung upward against the front end-board of the box and there locked by any approved device, as a hook. The rear axle 4 is bent to constitute two oppositely-disposed cranks, as shown in Fig. 6, and is rigidly attached to one rear wheel, the other being free thereon. Below the bed are two swinging treadles 5, the rear end of each detachably connected by means of hooks or other preferred method with the respective crank-centers of the rear axle and having their front ends suspended by detachable swinging links 6 with the wagon-bed. These treadles are of peculiar construction, and each has between its ends an opening, in which is pivotally mounted a pedal 7. Pivotally connected to one side of the bed 1 is a lever 8, having its lower end connected by a link 9 with one end of the front axle near to and inside of the wheel. Above its pivot the lever rocks inside of a strap 10, attached to the bed, and which limits its lateral and rocking movement, and in which is an orifice 11, which registers with a similar orifice in the lever, and by inserting a pin in these orifices the forward axle is locked against turning for a purpose to be stated. In the bottom of the bed is an elongated longitudinal opening having rabbeted edges, in which are fitted two detachable boards 12 13, united by hinges and arranged when lying horizontal to fit and close said opening.

As thus far described the vehicle with the treadles removed and the boards 12 13 fitting the opening in the bottom of the bed may be used as an ordinary wagon, or by throwing the tongue up, as shown, may be used for "coasting," the occupant steering it by the lever 8. By attaching the treadles and raising and sliding back the boards 12 13 it becomes a velocipede, one of the boards constituting the seat for the occcupant, the other a back-rest, while the feet, extending through the opening of the bed-bottom, are free to rest on and operate the treadles, the pivoted pedals affording free action of the muscles. In adapting it for a baby-walker the boards 12 13 are removed and a supporting-frame interposed, as shown in Fig. 1. This frame consists of sets of parallel bars 15 16, the lower ends of each set suitably outwardly supported, as by a cross-rod, and arranged to respectively fit and rest in the front and back of the interior of the bed, the upper ends of the first set connected by a rocking bar 17 and united with the upper ends of the second set by bars 18, the latter point of union being secured by a rod 19, extending between the ends of the bars 16 18 and preferably rounded to afford a hand-grasp. A harness consisting of a belt 20 to surround the body of the child below the arms and supporting-straps 21 is detachably connected with the rocking bar 17 by hooks 22 or other approved or preferred means and is adjusted to support the child so that its feet, depending through the opening in the bed, shall rest lightly on the floor, its hands grasping the rod 19, as shown in Fig. 1. When used for this purpose, the lever 8 is locked by a pin passing through the orifice 11 in the lever 8 into a corresponding orifice in the strap 10, whereby the front axle is rigidly held to direct the vehicle directly forward or to travel in a circle.

I claim—

1. A child's wagon having in the bottom of the bed a rabbeted opening, in combination with two detachable boards hinged together and arranged to fit said orifice, substantially as shown and described.

2. The wagon-box having the detachable hinged sliding bottom and the gearing and wheels, the rear axle being bent to form oppositely-disposed cranks, combined with the treadles, each detachably connected at one end with one of said cranks and suspended at the other by a swinging link, substantially as shown and described.

3. A child's wagon having a part of the bed-bottom detachable, combined with a detachable frame arranged to fit in said bed and provided with means, as hooks, to sustain a harness to support the child.

4. The combination, with a child's wagon having a part of the bed-bottom detachable, of a frame arranged to rest in the wagon-box and provided with means to sustain a child's harness and a bar for the child's hands to grasp, substantially as shown and described.

5. The combination, with a child's wagon having a part of the bed-bottom detachable and a detachable frame arranged to rest in said bed-bottom, of a harness to support the child, arranged to be connected with said frame, substantially as shown and described.

In testimony that I claim the above I hereunto set my hand.

DAVID F. LONG.

In presence of—
C. P. HUMPHREY,
C. E. HUMPHREY.